US 12,230,289 B2

(12) United States Patent
Corretjer

(10) Patent No.: US 12,230,289 B2
(45) Date of Patent: Feb. 18, 2025

(54) DEVICE AND METHOD FOR MACHINE-LEARNING BASED NOISE SUPPRESSION

(71) Applicant: MOTOROLA SOLUTIONS, INC., Chicago, IL (US)

(72) Inventor: Jesus F. Corretjer, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 291 days.

(21) Appl. No.: 17/897,287

(22) Filed: Aug. 29, 2022

(65) Prior Publication Data
US 2024/0070524 A1  Feb. 29, 2024

(51) Int. Cl.
*G10L 21/0208* (2013.01)
*G06N 20/00* (2019.01)
(Continued)

(52) U.S. Cl.
CPC .......... *G10L 21/0208* (2013.01); *G06N 20/00* (2019.01); *G10K 11/16* (2013.01);
(Continued)

(58) Field of Classification Search
CPC ..... G10L 21/0208; G10L 19/00; G10L 25/30; G06N 20/00; G10K 11/16; H04R 1/326; H04R 1/406; H04R 3/005; H04R 2410/01
(Continued)

(56) References Cited

U.S. PATENT DOCUMENTS

2001/0041976 A1* 11/2001 Taniguchi ............... G10L 19/18
704/E19.041
2019/0122689 A1  4/2019 Jain et al.
(Continued)

FOREIGN PATENT DOCUMENTS

EP  3057097 B1  9/2017

OTHER PUBLICATIONS

PCT/US2023/030705, Device and Method for Machine-Learning Based Noise Suppression, Aug. 21, 2023.
(Continued)

*Primary Examiner* — Vivian C Chin
*Assistant Examiner* — Douglas J Suthers
(74) *Attorney, Agent, or Firm* — PERRY + CURRIER INC.

(57) ABSTRACT

A device, system, and method for machine-learning based noise suppression is provided. The device (and/or system) comprises a microphone, an output device, a noise suppression engine and a machine-learning noise suppression engine. The machine-learning noise suppression engine receives audio data from the noise suppression engine or the microphone, applies machine learning algorithms to the audio data to generate machine-learning based noise suppression parameters, and provides the parameters to the noise suppression engine. The noise suppression engine receives the audio data from the microphone and, prior to receiving the parameters, applies non-machine-learning based noise suppression to the audio data to generate noise-suppressed audio data, and provides the noise-suppressed audio data to the output device. However, after receiving the parameters, the noise suppression engine applies the parameters to the noise-suppressed audio data to generate updated noise-suppressed audio data, and provides the updated noise-suppressed audio data to the output device.

20 Claims, 7 Drawing Sheets

(51) Int. Cl.
*G10K 11/16* (2006.01)
*G10L 19/00* (2013.01)
*G10L 25/30* (2013.01)
*H04R 1/32* (2006.01)
*H04R 1/40* (2006.01)
*H04R 3/00* (2006.01)

(52) U.S. Cl.
CPC .............. *G10L 19/00* (2013.01); *G10L 25/30* (2013.01); *H04R 1/326* (2013.01); *H04R 1/406* (2013.01); *H04R 3/005* (2013.01); *H04R 2410/01* (2013.01)

(58) Field of Classification Search
USPC .......................................................... 381/92
See application file for complete search history.

(56) References Cited

U.S. PATENT DOCUMENTS

| | | | |
|---|---|---|---|
| 2020/0111503 A1* | 4/2020 | Huang | G10L 21/0232 |
| 2020/0312343 A1* | 10/2020 | Hsiung | G06N 3/048 |
| 2021/0110840 A1 | 4/2021 | Chu et al. | |
| 2022/0262336 A1* | 8/2022 | Truong | G10K 11/17823 |

OTHER PUBLICATIONS

Hashemian, Reza, "Design of an Active Noise Control System Using Combinations of DSP and FPGAs", Published in 1995 PLD Conference Proceedings, Apr. 1996, Actel Corporation, Jun. 21, 2025 (Customer-Authored Application Note AC104).

* cited by examiner

DEVICE AND METHOD FOR MACHINE-LEARNING BASED NOISE SUPPRESSION

BACKGROUND OF THE INVENTION

Communication devices for first responders, such as land-mobile radios (LMRs) with microphones and output devices (e.g., a combination of a modem and antenna), generally have tight specifications on times for audio processing. Furthermore, noise suppression may be important in such communication devices, but may introduce delay in audio processing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
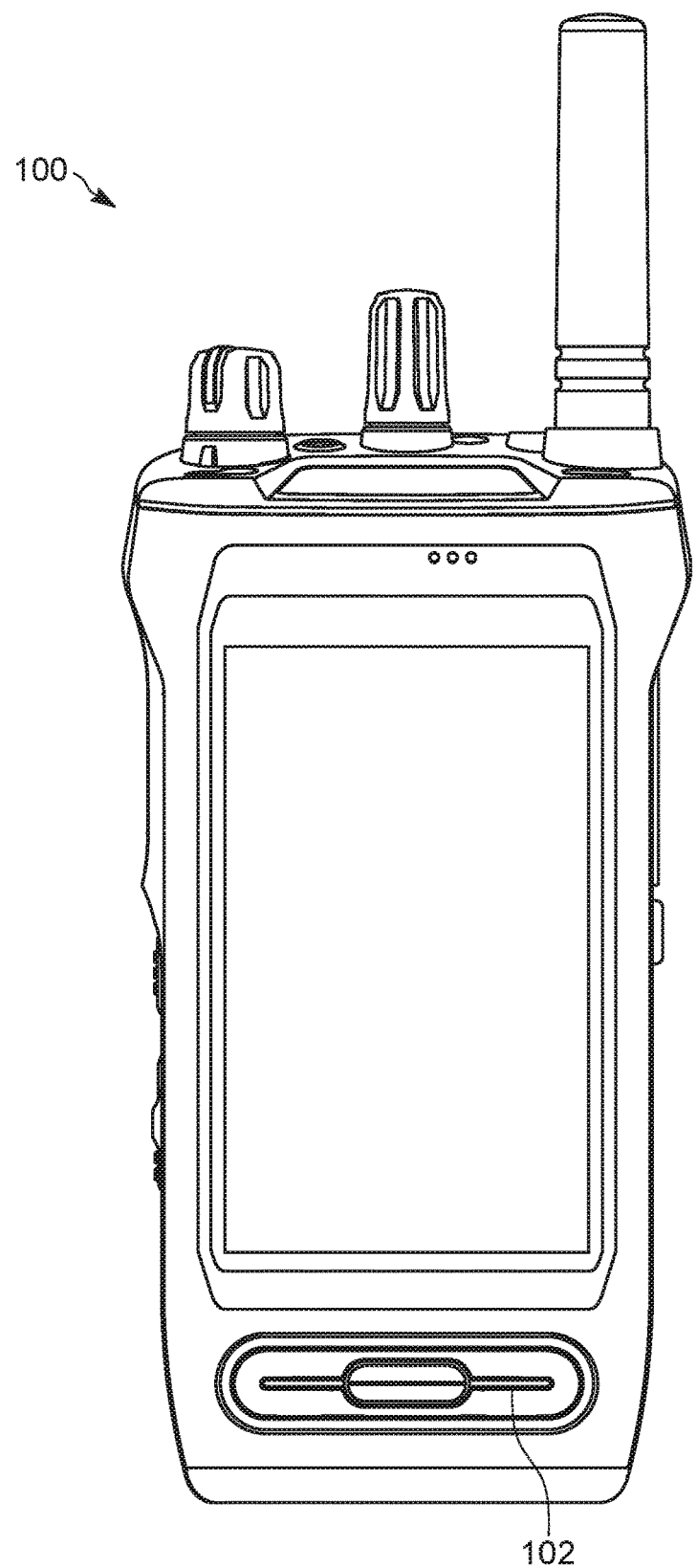
FIG. 1 is a device for machine-learning based noise suppression, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices for first responders, such as land-mobile radios (LMRs) with microphones and output devices (e.g., a combination of a modem and antenna), generally have tight specifications on times for audio processing. Furthermore, noise suppression may be important in such communication devices, but may introduce delay in audio processing. In particular, low audio delay and/or low audio latency may be critical in voice communications for first responders. For example, humans can typically tolerate up to 200 milliseconds of end-to-end audio delay while having voice conversations. Otherwise, they tend to talk over each other during voice calls. The longer the delay, the more noticeable it becomes. Thus, there exists a need for an improved technical method, device, and system for machine-learning based noise suppression.

Hence, provided herein is a device, system, and method for machine-learning based noise suppression. A communication device provided herein includes a microphone, an output device, as well as a noise suppression engine and a machine-learning noise suppression engine which operate in parallel. In some examples, the microphone may be provided in the form of a microphone array, though any suitable microphone is within the scope of the present specification. In some examples, the output device may be provided in the form of a combination of a modem and an antenna, though any suitable output device is within the scope of the present specification including, but not limited to, a speaker. In some examples, the device further includes an audio codec engine to convert audio data generated by the microphone into audio data to which noise suppression may be applied.

The noise suppression engine and the machine-learning noise suppression engine may be implemented at different processors, or on a same processor.

For example, the communication device may comprise a baseband processor configured to implement the noise suppression engine, and the communication device may further comprise an audio processor configured to implement the machine-learning noise suppression engine in parallel with the baseband processor implementing the noise suppression engine. In these examples, the baseband processor and the audio processor are understood to be in communication with each other, for example via an Inter-processor communication (IPC) mechanism and/or protocol and the like.

However, in other examples, the communication device may comprise a baseband processor, and the like, configured to implement the noise suppression engine and the machine-learning noise suppression engine in parallel.

Regardless, the noise suppression engine and the machine-learning noise suppression engine are generally implemented in parallel at the communication device. Indeed, the communication device provided herein may be configured according to a variety of device structures described in more detail below.

The machine-learning noise suppression engine is generally configured to receive the audio data from the noise suppression engine or the microphone (e.g., via the audio codec engine when present), depending on a device structure of the communication device. The machine-learning noise suppression engine generally applies one or more machine learning algorithms to the audio data to generate machine-learning based noise suppression parameters, and provides the machine-learning based noise suppression parameters to the noise suppression engine.

The noise suppression engine is generally configured to receive the audio data from the microphone (e.g., via the audio codec engine when present). The noise suppression engine, prior to receiving the machine-learning based noise suppression parameters, applies non-machine-learning based noise suppression to the audio data to generate noise-suppressed audio data; and provides the noise-suppressed audio data to the output device. However, after receiving the machine-learning based noise suppression parameters, the noise suppression engine applies the machine-learning based noise suppression parameters to the noise-suppressed audio data to generate updated noise-suppressed audio data, and provides the updated noise-suppressed audio data to the output device.

Hence, while the machine-learning based noise suppression parameters may provide better noise suppression than the non-machine-learning based noise suppression, the noise suppression engine does not wait for the machine-learning based noise suppression parameters before applying noise suppression. Rather, the noise suppression engine initially applies the non-machine-learning based noise suppression (e.g., one or more of a Wiener filter, a Personal Alert Safety System (PASS) alarm filter, a wind mitigation algorithm and a spectral subtraction algorithm, and the like) to the audio data, and after the machine-learning based noise suppression parameters are received, the noise suppression engine applies the machine-learning based noise suppression parameters to the audio data (e.g., while continuing to apply the non-machine-learning based noise suppression).

Hence, the communication device provided herein avoids delaying noise suppression by initially using non-machine-learning based noise suppression and then later applies machine-learning based noise suppression parameters to improve the noise suppression.

When the microphone comprises a microphone array, one or both of the noise suppression engine and the machine-learning noise suppression engine may perform beamforming on the audio data prior to applying noise suppression and/or generating the machine-learning based noise suppression parameters. For example, in device structures where both the noise suppression engine and the machine-learning noise suppression engine receive the audio data from the microphone (e.g., via the audio codec engine when present), both the noise suppression engine and the machine-learning noise suppression engine may perform beamforming. However, in device structures where the noise suppression engine, but not the machine-learning noise suppression engine, receives the audio data, the noise suppression engine may perform beamforming and provide beamformed audio data to the machine-learning noise suppression engine which generates the machine-learning based noise suppression parameters from the beamformed audio data.

A first aspect of the specification provides a device and/or system comprising: a microphone; an output device; a noise suppression engine configured to receive audio data from the microphone; and a machine-learning noise suppression engine configured to: receive the audio data from the noise suppression engine or the microphone; apply one or more machine learning algorithms to the audio data to generate machine-learning based noise suppression parameters; and provide the machine-learning based noise suppression parameters to the noise suppression engine, the noise suppression engine further configured to: prior to receiving the machine-learning based noise suppression parameters, apply non-machine-learning based noise suppression to the audio data to generate noise-suppressed audio data; and provide the noise-suppressed audio data to the output device; and after receiving the machine-learning based noise suppression parameters, apply the machine-learning based noise suppression parameters to the noise-suppressed audio data to generate updated noise-suppressed audio data; and provide the updated noise-suppressed audio data to the output device.

A second aspect of the specification provides a method comprising: receiving, at a noise suppression engine, audio data from a microphone; and receiving, at a machine-learning noise suppression engine, the audio data from the noise suppression engine or the microphone; applying, at the machine-learning noise suppression engine, one or more machine learning algorithms to the audio data to generate machine-learning based noise suppression parameters; providing, from the machine-learning noise suppression engine to the noise suppression engine, the machine-learning based noise suppression parameters; prior to the noise suppression engine receiving the machine-learning based noise suppression parameters: applying, at the noise suppression engine, non-machine-learning based noise suppression to the audio data to generate noise-suppressed audio data; and providing, from the noise suppression engine to an output device, the noise-suppressed audio data; and after the noise suppression engine receiving the machine-learning based noise suppression parameters: applying, at the noise suppression engine, the machine-learning based noise suppression parameters to the noise-suppressed audio data to generate updated noise-suppressed audio data; and providing, from the noise suppression engine to the output device, the updated noise-suppressed audio data.

Each of the above-mentioned aspects will be discussed in more detail below, starting with example system and device architectures in which the embodiments may be practiced, followed by an illustration of processing blocks for achieving an improved technical method, device, and system for machine-learning based noise suppression.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. The cloud services may interface with appropriate secondary processor (s) through various interfaces, including the internet, WiFi, Ethernet, broadband cellular systems and/or networks (e.g., LTE, Long Term Evolution) systems and/or networks) and the like, wherein the cloud computing system provides application specific services which may be used independent of, or in tandem with, other computer systems and networks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Figure 2:
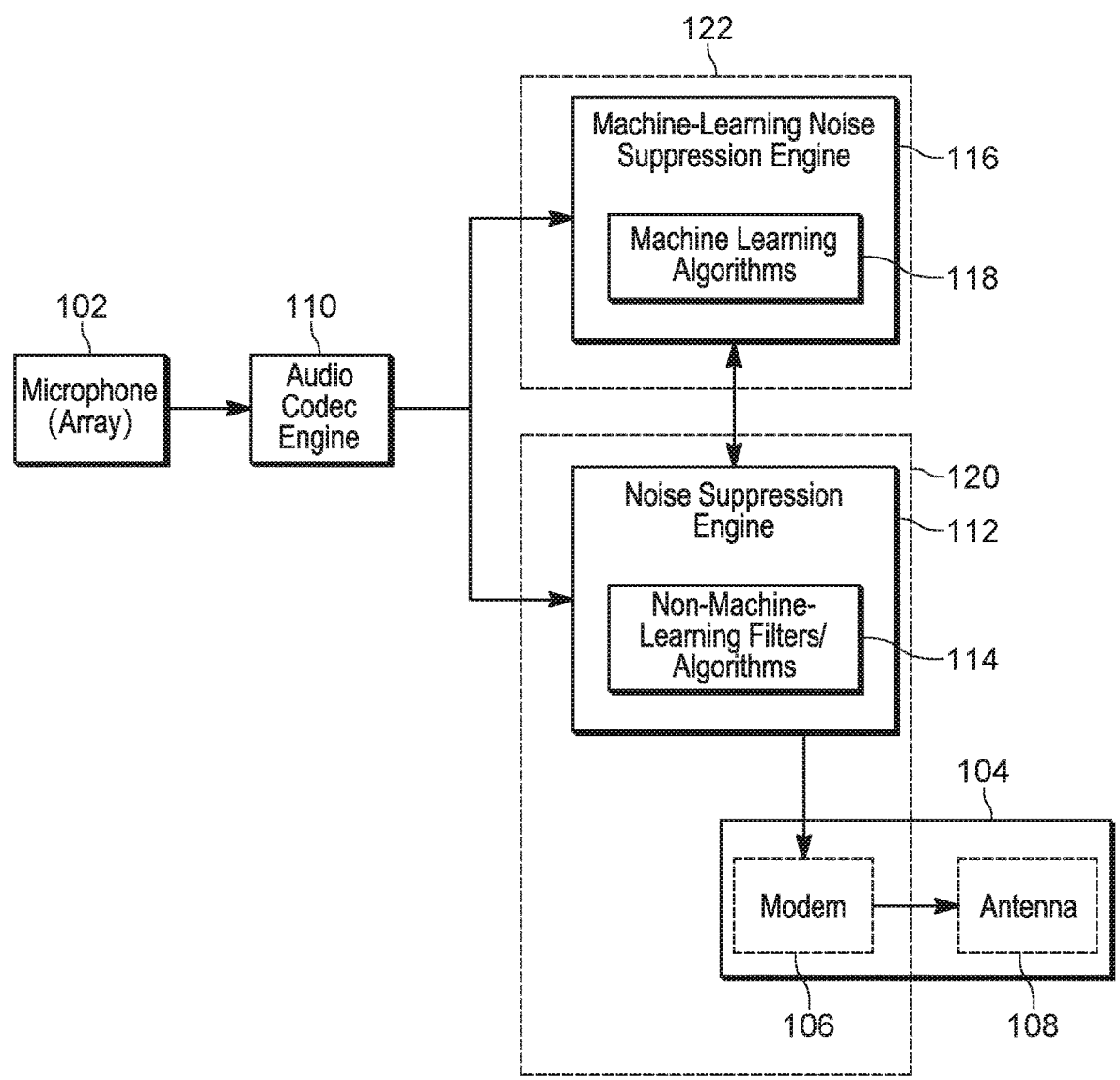
FIG. 2 is a device diagram showing a device structure of the device for machine-learning based noise suppression, in accordance with some examples.

Attention is directed to FIG. 1 and FIG. 2 that respectively depict a perspective view, and a block diagram, of a device 100 comprising a microphone 102 and which performs machine-learning based noise suppression as described herein.

As depicted in FIG. 1, the device 100 comprises a mobile radio adapted for use by first responders, and the like, and may specifically comprise a land mobile radio (LMR), and the like, for assisting first responders in responding to incidents.

However, the device 100 may comprise any suitable portable device, partially portable device, and/or non-portable device. In particular examples, the device 100 may comprise any suitable mobile communication device, any suitable portable device, cell phone, a radio, a body-worn camera (e.g., with audio functionality), a remote speaker microphone (RSM), a first responder device, a laptop computer, a headset, and the like, and/or any device that includes a microphone and provides audio data to an output device, as described herein. Furthermore, while the device 100 is described hereafter as having radio functionality, the device 100 may be generally configured for any suitable audio functionality, which may not include radio functionality.

Figure 4:
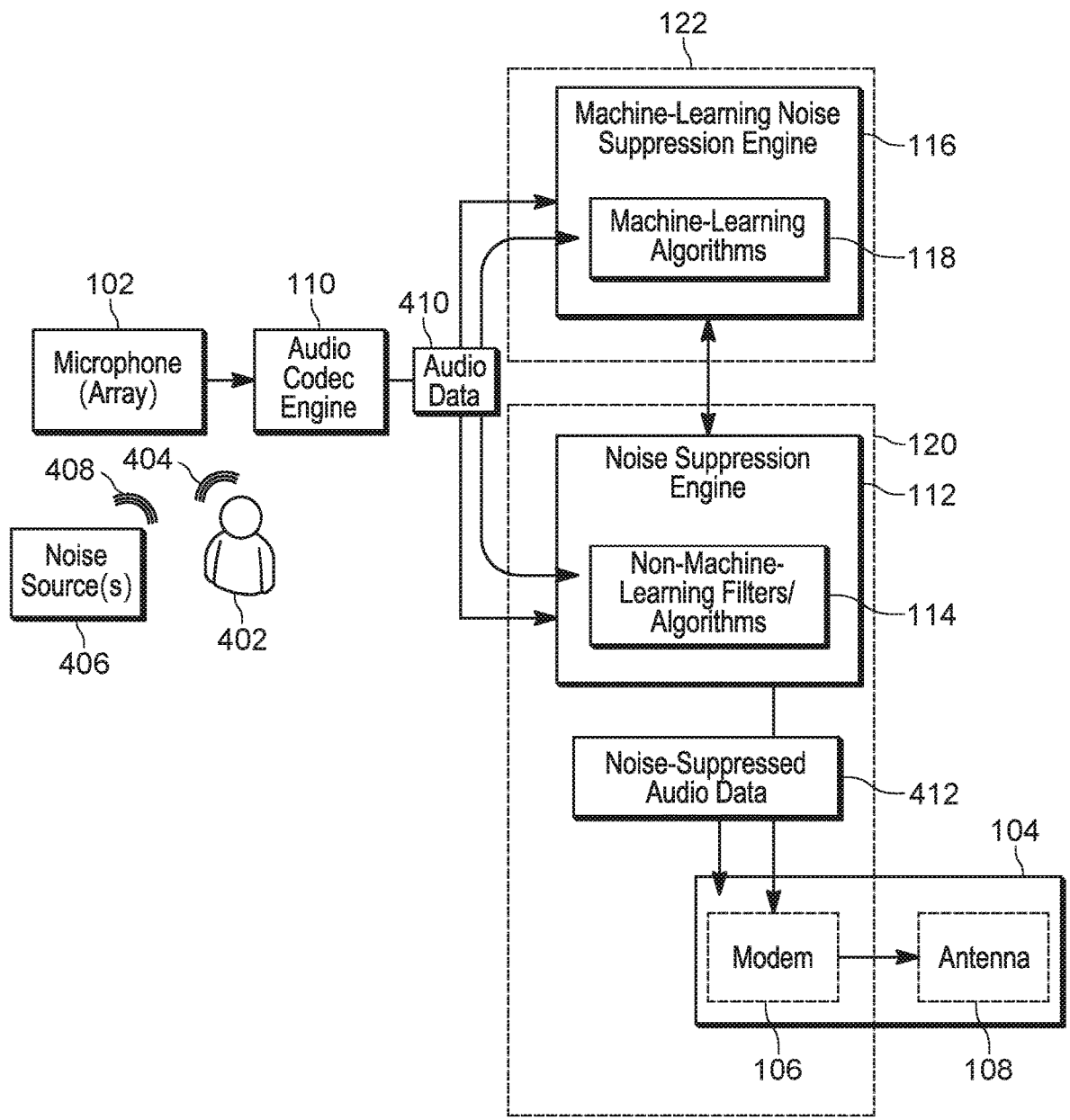
FIG. 4 depicts the device structure of FIG. 1 implementing a method for machine-learning based noise suppression, in accordance with some examples.

With reference to FIG. 2, the device 100 comprises the microphone 102, and an output device 104. Communication links between components of the device 100 are depicted in FIG. 4 as arrows. While the components depicted in FIG. 2 are understood to be combined in the device 100, in other examples, the components depicted in FIG. 2 may be provided in more than one device, though interconnected with each other, for example as a system for machine-learning based noise suppression.

The microphone 102 may comprise any suitable microphone which may receive sound and convert the sound (e.g., using a transducer) to audio data. Put another way, the microphone 102 may generate the audio data from sound. The microphone 102 may, in some examples, comprise a microphone array such that the audio data generated in conjunction with the microphone 102 may be beamformed, as described in more detail below. However, in other examples, the microphone 102 may not include a microphone array and audio data, generated in conjunction with the microphone 102, may not be beamformed.

As depicted, the output device 104 comprises a modem 106 and an antenna 108 and hence the output device 104 may be provided in the form of a transmitter and/or transceiver configured to perform radio functionality for the device 100 such as transmitting noise-suppressed audio data as described herein. Alternatively, and/or in addition, the output device 104 may comprise a speaker for providing and/or playing the noise-suppressed audio data. However, the output device 104 may comprise any suitable output device.

As depicted, the device 100 further comprises an audio codec engine 110, which may be optional, and which, when present, is in communication with the microphone 102. In these examples, the microphone 102 may convert the sound into audio data and provide the audio data to the audio codec engine 110. The audio codec engine 110 may receive the audio data and convert the audio data received from the microphone 102 into a different format, such as a given streaming media audio coding format. However, in other examples, the audio codec engine 110 may not be present, and/or functionality of the audio codec engine 110 may be integrated with another component of the device 100, including, but not limited to, the microphone 102 and/or a baseband processor of the device 100 (described below), and/or another processor of the device 100. Hence, hereafter, while reference will be made to components of the device 100 receiving audio data from the microphone 102, it is understood that, in some examples, the audio data may be received from the microphone 102 via the audio codec engine 110, and the like. Regardless, such audio data is understood to be in a format to which noise suppression may be applied.

The device 100 further comprises a noise suppression engine 112 configured to receive audio data from the microphone 102 (e.g., via the audio codec engine 110). In examples, where the microphone 102 comprises a microphone array, the noise suppression engine 112 may perform beamforming on the audio data as received from the microphone array, for example to generate beamformed audio data. As will be described hereafter, the noise suppression engine 112 is generally configured to: apply non-machine-learning based noise suppression to the audio data (e.g., in the form of the beamformed audio data) to generate noise-suppressed audio data; and provide the noise-suppressed audio data to the output device 104, which outputs the noise-suppressed audio data (e.g., the noise-suppressed audio data may be transmitted via the modem 106 and the antenna 108).

For example, as depicted, the noise suppression engine 112 may implement one or more preconfigured non-machine-learning based filters and/or algorithms 114, which may include, but is not limited to, one or more of a Wiener filter, a Personal Alert Safety System (PASS) alarm filter, a wind mitigation algorithm, a spectral subtraction algorithm and the like. In particular, such filters and/or algorithms 114 may be applied to audio data to remove noise, for example due to wind, a PASS alarm, and/or other sources of noise, removed without machine learning techniques and which may be preconfigured. For example, noise, and/or other factors, due to wind, a PASS alarm, and/or other sources of noise, may have known spectral features (e.g., at certain predetermined frequencies) and such known spectral features may be subtracted and/or filtered from the audio data (e.g., using a spectral subtraction algorithm, and the like).

However, such non-machine-learning based filters and/or algorithms 114 may not provide sufficient noise suppression in all environments in which the device 100 may be located.

For example, in some environments, ambient noise may occur which may not be suppressed from the audio data by the non-machine-learning based filters and/or algorithms 114. For example, the device 100 may be located in an environment with a crying baby and/or or a siren and/or running water, and/or other types of ambient noise which may be unpredictable and hence it may be challenging to provide non-machine-learning based filters and/or algorithms 114 which suppress such noise.

As such, the device 100 further comprises a machine-learning noise suppression engine 116 which, as depicted, is configured to receive the audio data from the microphone 102 (e.g., via the audio codec engine 110). The machine-learning noise suppression engine 116 is further configured to apply one or more machine learning algorithms 118 to the audio data to generate machine-learning based noise suppression parameters; and provide the machine-learning based noise suppression parameters to the noise suppression engine 112.

In examples, where the microphone 102 comprises a microphone array, the machine-learning noise suppression engine 116 may perform beamforming on the audio data as received from the microphone array, for example to generate beamformed audio data, and the machine-learning noise suppression engine 116 may apply the one or more machine learning algorithms 118 to the audio data in the form of the beamformed audio data to generate the machine-learning based noise suppression parameters.

However, as will be described below with respect to FIG. 6 and FIG. 7, the device 100 may alternatively be adapted for other device structures in which the machine-learning noise suppression engine 116 receives the audio data from the noise suppression engine 112. In these examples, where the microphone 102 comprises a microphone array, the machine-learning noise suppression engine 116 may not perform beamforming, but rather relies on the noise suppression engine 112 to perform the beamforming, and the audio data received from the noise suppression engine 112 may be in form of beamformed audio data.

Regardless of the source and/or format of the audio data, the machine-learning noise suppression engine 116 may implement one or more machine learning algorithms 118 to generate machine-learning based noise suppression parameters.

The one or more machine learning algorithms 118 may be trained to receive audio data (in any suitable format) and output machine-learning based noise suppression parameters, which, when applied to audio data, suppresses noise in the audio data.

The one or more machine learning algorithms 118 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network is within the scope of present examples.

The one or more machine learning algorithms 118 may be operated in a training mode to train the one or more machine learning algorithms 118 to receive audio data (in any suitable format) and output machine-learning based noise suppression parameters, which, when applied to audio data, suppresses noise in the audio data.

The machine-learning based noise suppression parameters may include, but is not limited to, one or more of: a noise mask; a binary noise mask; a ratio noise mask; a complex noise mask; one or more noise directionality parameters; one or more noise periodicity parameters; one or more noise spectral content parameters; and the like, amongst other possibilities.

A noise mask may comprise a filter which, when applied to audio data, removes and/or reduces given frequencies from the audio data.

Similarly, a binary noise mask may comprise a filter which, when applied to audio data, removes and/or reduces frequencies above or below a given frequency from the audio data.

Similarly, a ratio noise mask may comprise a filter which, when applied to audio data, removes and/or reduces given frequencies from the audio data according to a given ratio.

Similarly, a complex noise mask may comprise a filter which, when applied to audio data, removes and/or reduces given complex frequency components from the audio data.

Noise directionality parameters may comprise parameters, which, when applied to audio data (e.g., via a suitable noise suppression algorithm), removes and/or reduces given frequencies from a given direction from the audio data; such noise directionality parameters may be used when the microphone 102 comprises a microphone array and audio data therefrom has directionality and/or may be beamformed.

Noise periodicity parameters may comprise parameters, which, when applied to audio data (e.g., via a suitable noise suppression algorithm), removes and/or reduces given periodic frequency components from the audio data. Such periodic frequency components may be periodic in time and/or such periodic frequency components may be periodic in frequency (e.g., similar to harmonic frequencies).

Noise spectral content parameters may comprise parameters, which, when applied to audio data (e.g., via a suitable noise suppression algorithm), removes and/or reduces given spectral content from the audio data (e.g., over a given frequency range and/or according to a given spectral shape over the given frequency range).

It is understood that the one or more machine learning algorithms 118 are generally trained to generally and/or generically identify different types of noise in audio data and output machine-learning based noise suppression parameters which suppress such noise.

For example, the audio data may include noise that includes periodic frequencies which are not suppressed using the non-machine-learning filters and/or algorithms 114; and the one or more machine learning algorithms 118 may identify such periodic frequencies and generate machine-learning based noise suppression parameters which, when applied to the audio data, suppresses such periodic frequencies in the audio data. For example, as different noise sources may produce different types of periodic frequencies, preconfiguring the noise suppression engine 112 to suppress such periodic frequencies may be challenging, and the one or more machine learning algorithms 118 may be used to identify such periodic frequencies.

Similarly, the audio data may include noise that includes frequencies that occur according to a certain spectral shape (e.g., a crying baby) which are not suppressed using the non-machine-learning filters and/or algorithms 114; and the one or more machine learning algorithms 118 may identify such a spectral shape of frequencies and generate machine-learning based noise suppression parameters which, when applied to the audio data, suppresses such a spectral shape of frequencies in the audio data. For example, as different babies may produce different spectral shapes of frequencies when crying, preconfiguring the noise suppression engine 112 to suppress such spectral shapes may be challenging, and the one or more machine learning algorithms 118 may be used to identify such spectral shapes.

Hence, in general, the machine-learning noise suppression engine 116 receives audio data in any suitable format, applies the one or more machine learning algorithms 118 to the audio data to analyze the audio data for noise, and generates one or more machine-learning based noise suppression parameters to suppress such noise. The one or more machine-learning based noise suppression parameters are provided to the noise suppression engine 112, which applies the machine-learning based noise suppression parameters to the audio data, which is output to the output device 104 to better suppress noise in the audio data. For example, the noise suppression engine 112 may apply the machine-learning based noise suppression parameters to the audio data using one or more noise suppression algorithms configured to apply one or more of the aforementioned masks, and the like, to audio data.

However, as it may take time for the machine-learning noise suppression engine 116 to generate the one or more machine-learning based noise suppression parameters, the noise suppression engine 112 does not wait for the one or more machine-learning based noise suppression parameters before suppressing noise in the audio data.

Rather, prior to receiving the machine-learning based noise suppression parameters, the noise suppression engine 112 applies non-machine-learning based noise suppression to the audio data (e.g., using the one or more non-machine-learning noise suppression filters and/or algorithms 114) to generate noise-suppressed audio data, and provides the noise-suppressed audio data to the output device 104. Hence, noise suppression occurs at the noise suppression engine 112 upon receiving the audio data from the microphone 102 (e.g., via the audio codec engine 110).

However, after receiving the machine-learning based noise suppression parameters, the noise suppression engine 112 applies the machine-learning based noise suppression parameters to the noise-suppressed audio data to generate updated noise-suppressed audio data, and provides the updated noise-suppressed audio data to the output device 104. The noise suppression engine 112 may continue to apply the non-machine-learning and/or algorithms 114 to the audio data in addition to the machine-learning based noise suppression parameters such that the updated noise-suppressed audio data benefits from noise suppression both due to the non-machine-learning and/or algorithms 114 and the machine-learning based noise suppression parameters.

Also depicted in FIG. 2 is a two-processor device structure of the device 100. In particular, as depicted, the device 100 comprises a baseband processor 120 and an audio processor 122 in communication with each other for example via an IPC mechanism and/or protocol and the like. Hence, the processor 120, 122 are generally configured to communicate with each other to exchange data as described herein.

Furthermore, as depicted the baseband processor 120 is configured to implement the noise suppression engine 112, and the audio processor 122 is configured to implement the machine-learning noise suppression engine 116 in parallel with the baseband processor 120 implementing the noise suppression engine 112.

The baseband processor 120 may comprise any suitable processor which implements the noise suppression engine 112 and which may implement any other suitable functionality of the device 100, such as the audio codec engine 110, and the like. Indeed, it is understood that a baseband processor may comprise any suitable processor that assists at converting digital data into radio frequency signals (and vice-versa) which can then be transmitted over a RAN (Radio Access Network), for example using the modem 106 and the antenna 108 of the output device 104.

Furthermore, as depicted, the modem 106 of the output device 104 may be integrated into the baseband processor 120, though, as depicted, the antenna 108 of the output device 104 may be external to the baseband processor 120. However, in other examples, the output device 104 may be entirely external to a processor implementing the noise suppression engine 112. For example, the modem 106 may be external to a processor implementing the noise suppression engine 112 and/or the modem 106 may be external to the baseband processor 120.

The audio processor 122 may comprise any suitable processor and/or digital signal processor (DSP), which may be dedicated to implementing the machine-learning noise suppression engine 116. Hence, in some examples, the device 100 may comprise an LMR that includes a suitable baseband processor 120, and which has been modified to include the audio processor 122 to generate machine-learning based noise suppression parameters in parallel with the baseband processor 120 performing noise suppression. While the processors 120, 122 are respectively described with respect to a baseband processor and an audio processor (e.g., a DSP), the processor 120, 122 may comprise any suitable processors.

Furthermore, such a device structure may ensure that the device 100 meets given audio delay specifications (e.g. such as less than 200 milliseconds of end-to-end audio delay while having voice conversations). Other device structures for the device 100 are described below with respect to FIG. 6 and FIG. 7, which may also ensure that the device 100 meets given audio delay specifications (e.g. such as less than 200 milliseconds of end-to-end audio delay while having voice conversations).

While not depicted, it is understood that the device 100 may comprise any suitable combination of memories (e.g., a Random-Access Memory (RAM), a code Read Only Memory (ROM)) for storing instructions to provide functionality for the device 100, as well as a common data and address bus and the like Furthermore, it is understood that the output device 104 may include (and/or be a component of) any suitable combination of wireless (and/or wired) transceivers, wireless (and/or wired) input/output (I/O) interfaces etc. for providing radio functionality to the device 100 (e.g., as well as a combined modulator/demodulator of which the modem 106 may be a component). Similar to as depicted in FIG. 2, at least a portion of such transceivers (e.g. such as the modem 106) may be integrated with the baseband processor 120.

Hence, one or more transceivers of the device 100 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, one or more transceivers of the output device 104 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The processors 120, 122 may include one or more logic circuits, one or more processors, one or more microprocessors, one or more GPUs (Graphics Processing Units), and/or the processors 120, 122 may include one or more ASIC (application-specific integrated circuits) and one or more FPGA (field-programmable gate arrays), and/or another electronic device.

Figure 3:
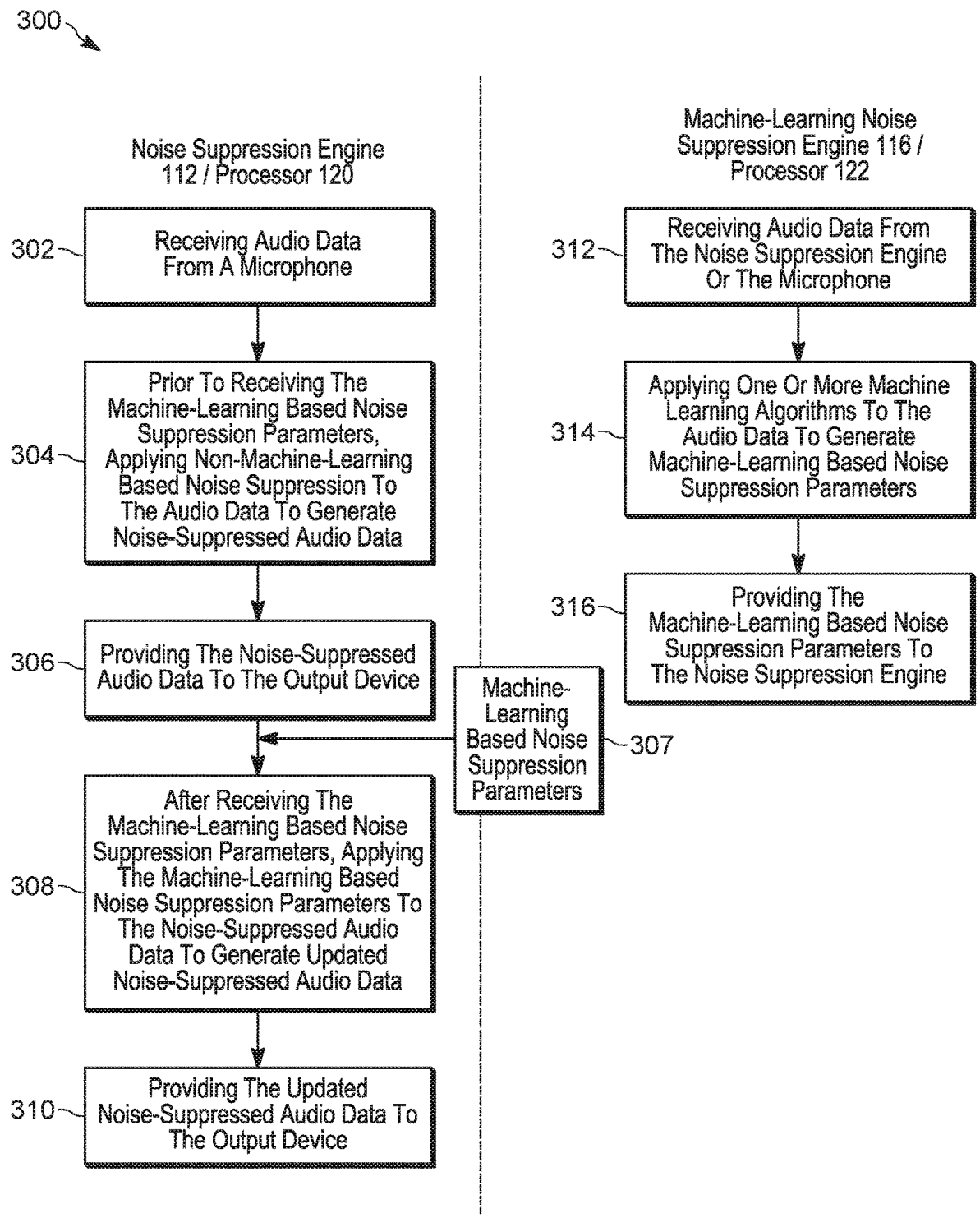
FIG. 3 is a flowchart of a method for machine-learning based noise suppression, in accordance with some examples.

Attention is now directed to FIG. 3, which depicts a flowchart representative of a method 300 for machine-learning based noise suppression. The operations of the method 300 of FIG. 3 correspond to the engines 112, 116 and/or machine readable instructions that are executed by the processors 120, 122. The method 300 of FIG. 3 is one way that the device 100 may be configured. Furthermore, the following discussion of the method 300 of FIG. 3 will lead to a further understanding of the device 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the device 100 of FIG. 1, as well.

Furthermore it is understood that the blocks 302 to 310 are performed by the noise suppression engine 112 and/or the processor 120, and the blocks 312 to 316 are performed by the machine-learning noise suppression engine 116 and/or the audio processor 122.

Furthermore, it is understood that the blocks 302 to 310 may be performed by the noise suppression engine 112 and/or the processor 120 in parallel with the blocks 312 to 316 performed by the machine-learning noise suppression engine 116 and/or the audio processor 122.

At a block 302, the noise suppression engine 112 and/or the processor 120 receives audio data, for example from the microphone 102 and/or the audio codec engine 110. The audio data may generally comprise voice data and/or voice communications, for example due to an operator of the device 100 speaking into the microphone 102, and the like. The audio data may, however, generally include noise.

At a block 304, the noise suppression engine 112 and/or the processor 120, prior to receiving machine-learning based noise suppression parameters (e.g., from the machine-learning noise suppression engine 116 and/or the audio processor 122) applies non-machine-learning based noise suppression to the audio data to generate noise-suppressed audio data, for example using the one or more non-machine-learning filters and/or algorithms 114.

At a block 306, the noise suppression engine 112 and/or the processor 120 provides the noise-suppressed audio data to the output device 104. The output device 104 outputs the noise-suppressed audio data, for example by transmitting the noise-suppressed audio data via the modem 106 and the antenna 108.

As also seen in FIG. 3, and which will be described in more detail below, after applying the non-machine-learning based noise suppression to the audio data to generate noise-suppressed audio data, and after providing the noise-suppressed audio data to the output device 104, the noise suppression engine 112 and/or the processor 120 receives machine-learning based noise suppression parameters 307 from the machine-learning noise suppression engine 116 and/or the audio processor 122.

At a block 308, the noise suppression engine 112 and/or the processor 120, after receiving the machine-learning based noise suppression parameters 307, applies the machine-learning based noise suppression parameters 307 to the noise-suppressed audio data to generate updated noise-suppressed audio data.

At a block 310, the noise suppression engine 112 and/or the processor 120 provides the updated noise-suppressed audio data to the output device 104, which outputs the updated noise-suppressed audio data, for example by transmitting the updated noise-suppressed audio data via the modem 106 and the antenna 108.

At a block 312, the machine-learning noise suppression engine 116 and/or the audio processor 122 receives the audio data from the noise suppression engine 112 (and/or the processor 120) or the microphone 102. The source of the audio data at the machine-learning noise suppression engine 116 and/or the audio processor 122 may depend on the structure of the device 100, and is described in more detail below. In particular, device structures in which the machine-learning noise suppression engine 116 and/or the audio processor 122 receives the audio data from the microphone 102 (and/or the audio codec engine 110) are described with respect to FIG. 4 and FIG. 5; and device structures in which the machine-learning noise suppression engine 116 and/or the audio processor 122 receives the audio data from the noise suppression engine 112 (and/or the processor 120) are described with respect to FIG. 6 and FIG. 7.

At a block 314, the machine-learning noise suppression engine 116 and/or the audio processor 122 applies the one or more machine learning algorithms 118 to the audio data to generate the machine-learning based noise suppression parameters 307.

At a block 316, the machine-learning noise suppression engine 116 and/or the audio processor 122 provides the machine-learning based noise suppression parameters 307 to the noise suppression engine 112 (and/or the processor 120), which applies the machine-learning based noise suppression parameters 307 to the noise-suppressed audio data to generate updated noise-suppressed audio data at the block 308.

The method 300 may be adapted to include any suitable features.

For example, when the device 100 includes the audio codec engine 110, at the block 302, the noise suppression engine 112 and/or the processor 120 may receive the audio data from the microphone 102 via the audio codec engine 110. Similarly, at the block 312, the machine-learning noise suppression engine 116 and/or the audio processor 122 may receive the audio data from the noise suppression engine 112 (and/or the processor 120), or the microphone 102 via the audio codec engine 110. Furthermore, when the microphone 102 comprises a microphone array, the machine-learning noise suppression engine 116 may receive the audio data from: the noise suppression engine 112; or the microphone array via the audio codec engine 110.

Furthermore, when the microphone 102 comprises a microphone array, at the block 304, and/or prior to the block 304, the noise suppression engine 112 and/or the processor

120 prior to applying the non-machine-learning based noise suppression to the audio data, may perform beamforming on the audio data as received from the microphone array. However, in other examples, the device 100 may be provided with a separate beamforming engine (e.g., implemented by the processor 120 or another processor) which performs the beamforming. In general, a beamforming process identifies portions of the audio data that corresponds to audio data of interest, for example from a particular direction, and filters out other audio data, such that the audio data that corresponds to audio data of interest remains, and the other audio data is discarded. For example, a portion of the microphone array may receive sound of a voice of an operator of the device 100 and audio data generated by such a portion of the microphone array may be kept in the beamforming process while other audio data from other portions of the microphone array may be discarded.

Similarly, when the microphone 102 comprises a microphone array, and in examples where the machine-learning noise suppression engine 116 and/or the audio processor 122 receives the audio data from the microphone 102 (and/or the audio codec engine 110), at the block 312, the machine-learning noise suppression engine 116 and/or the audio processor 122 may receive the audio data from the microphone 102 by receiving the audio data from the microphone array. At the block 314, and/or prior to the block 314, the machine-learning noise suppression engine 116 and/or the audio processor 122, prior to applying the one or more machine learning algorithms 118 to the audio data, may perform beamforming on the audio data to generate beamformed audio data. Hence, in these examples, at the block 314, the machine-learning noise suppression engine 116 and/or the audio processor 122 may apply the one or more machine learning algorithms 118 to the beamformed audio data to generate the machine-learning based noise suppression parameters 307.

However, in other examples, when the microphone 102 comprises a microphone array, and in examples where the machine-learning noise suppression engine 116 and/or the audio processor 122 receives the audio data from the noise suppression engine 112, at the block 304 and/or prior to the block 304, the noise suppression engine 112 and/or the processor 120, prior to applying non-machine-learning based noise suppression to the audio data, may perform beamforming on the audio data to generate beamformed audio data. In these examples, the noise suppression engine 112 and/or the processor 120 may provide the beamformed audio data to the machine-learning noise suppression engine 116 and/or the audio processor 122. In these examples, the machine-learning noise suppression engine 116 and/or the audio processor 122 may be further configured to: at the block 312, receive the audio data from the noise suppression engine 112 in a form of the beamformed audio data; and apply, at the block 314, the one or more machine learning algorithms 118 to the audio data, in the form of the beamformed audio data, to generate the machine-learning based noise suppression parameters. Such examples are described with respect to FIG. 6 and FIG. 7.

It is further understood that the blocks 312 to 316 may generally repeat such that, as further audio data is received, the machine-learning noise suppression engine 116 and/or the audio processor 122 continues to generate and/or update machine-learning based noise suppression parameters 307. Similarly the blocks 302, and the blocks 308 to 316 generally repeat such that, as further audio data is received, the noise suppression engine 112 and/or the processor 120 continues to apply the machine-learning based noise suppression parameters 307, as well as the non-machine-learning based noise suppression, to the audio data. Hence, as noise conditions at the device 100 change, noise suppression may change as the machine-learning based noise suppression parameters 307 are updated according to such changes. Put another way, the machine-learning noise suppression engine 116 and/or the audio processor 122 may generate and/or update the machine-learning based noise suppression parameters 307 (e.g., periodically, and the like) and provide the updated machine-learning based noise suppression parameters 307 to the noise suppression engine 112 and/or the processor 120, which may use the updated machine-learning based noise suppression parameters 307 for noise suppression rather than previously received machine-learning based noise suppression parameters 307.

In some examples, the device 100, and/or one or more of the processors 120, 122, may store (e.g., at a memory of the device 100) the machine-learning based noise suppression parameters 307 for use in future implementations of the method 300; however, in these future implementations, the blocks 304, 306 may not be implemented. In specific examples, the baseband processor 120 stores the machine-learning based noise suppression parameters 307, such as when the machine-learning based noise suppression parameters 307 are received. Rather, the device 100 may apply both the non-machine-learning filters/algorithms 114 to the audio data as well as apply the machine-learning based noise suppression parameters 307 as retrieved from the memory. The blocks 302, and 308 to 316 may be implemented to adapt the machine-learning based noise suppression parameters 307 to presently received noise at the device 100.

Figure 5:
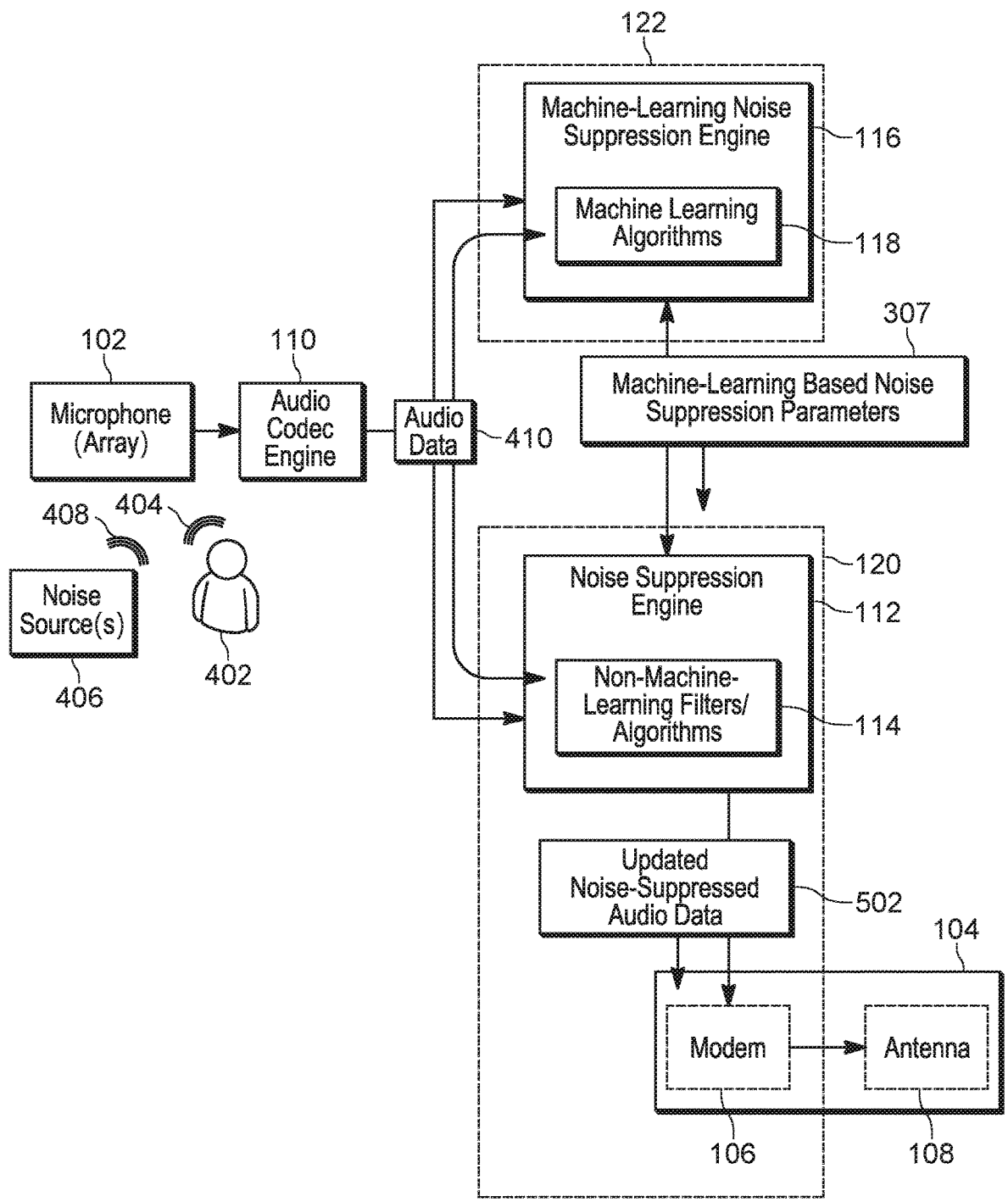
FIG. 5 depicts the device structure of FIG. 1 continuing to implement a method for machine-learning based noise suppression, in accordance with some examples.

Examples of the method 300 are next described with respect to FIG. 4 and FIG. 5, which are substantially similar to FIG. 2 with like components having like numbers.

As depicted in FIG. 4, an operator of the device 100 is speaking into the microphone 102, for example producing sound 404, but there are also one or more noise sources 406 nearby that are producing noise 408. Both the sound 404 and the noise 408 are detected by the microphone 102.

As depicted, audio data 410 is generated, for example by a combination of the microphone 102 and the audio codec engine 110, and the audio data 410 is received at both the noise suppression engine 112 (e.g., at the block 302 of the method 300) and the machine-learning noise suppression engine 116 (e.g., at the block 312 of the method 300).

As the audio data 410 is received at the noise suppression engine 112, the noise suppression engine 112 applies noise suppression to the audio data 410 (e.g., at the block 304 of the method 300) to generate noise-suppressed audio data 412 (e.g., using the one or more non-machine-learning filters and/or algorithms 114). The noise suppression engine 112 provides (e.g., at the block 306 of the method 300) the noise-suppressed audio data 412 to the output device 104 (e.g. to the modem 106) which may wirelessly transmit the noise-suppressed audio data 412 (e.g. via the antenna 108).

While not depicted, the noise suppression engine 112 may further perform beamforming on the audio data 410, for example when the microphone 102 comprises a microphone array. Such beamforming may occur prior to applying noise suppression to the audio data 410 to generate the noise-suppressed audio data 412.

Attention is next directed to FIG. 5 which is understood to follow, in time, the example of FIG. 4. In particular, in FIG. 5, the machine-learning noise suppression engine 116 also receives the audio data 410 and, while the noise suppression engine 112 is generating the noise-suppressed audio data 412, the machine-learning noise suppression engine 116 applies the one or more machine learning algorithms 118 to the audio data 410 to generate (e.g., at the block 314 of the method 300) the machine-learning based noise suppression parameters 307. The machine-learning noise suppression engine 116 provides (e.g., at the block 316 of the method 300) the machine-learning based noise suppression parameters 307 to the noise suppression engine 112.

Similar to the noise suppression engine 112, the machine-learning noise suppression engine 116 may also perform beamforming on the audio data 410 when the microphone 102 comprises a microphone array. It is understood in these examples that a beamforming process applied at the noise suppression engine 112 and the machine-learning noise suppression engine 116 are generally the same and/or similar.

The noise suppression engine 112 receives the machine-learning based noise suppression parameters 307, and applies (e.g., at the block 308 of the method 300) the machine-learning based noise suppression parameters 307 to the noise-suppressed audio data 412 to generate updated noise-suppressed audio data 502.

The noise suppression engine 112 provides (e.g., at the block 310 of the method 300) the updated noise-suppressed audio data 502 to the output device 104 (e.g. to the modem 106) which may wirelessly transmit the updated noise-suppressed audio data 502 (e.g. via the antenna 108). It is understood that the updated noise-suppressed audio data 502 comprises the audio data 410 (e.g., which may be beamformed) with noise suppression of the one or more non-machine-learning filters and/or algorithms 114 applied thereto, and with noise suppression of the machine-learning based noise suppression parameters 307 applied thereto.

Hence, the noise-suppressed audio data 412 is first provided to the output device 104 and later replaced by the updated noise-suppressed audio data 502 which may have more noise suppressed than in the noise-suppressed audio data 412. When the noise-suppressed audio data 412, and later the updated noise-suppressed audio data 502, is received at another communication device and converted to sound, a listener may initially hear the noise-suppressed audio data 412 and, when the updated noise-suppressed audio data 502 is converted to sound, the listener may hear an improvement in the noise suppression (e.g., as compared to the noise-suppressed audio data 412). For example, noise of a crying baby in the noise-suppressed audio data 412 may be suppressed in the updated noise-suppressed audio data 502.

Figure 6:
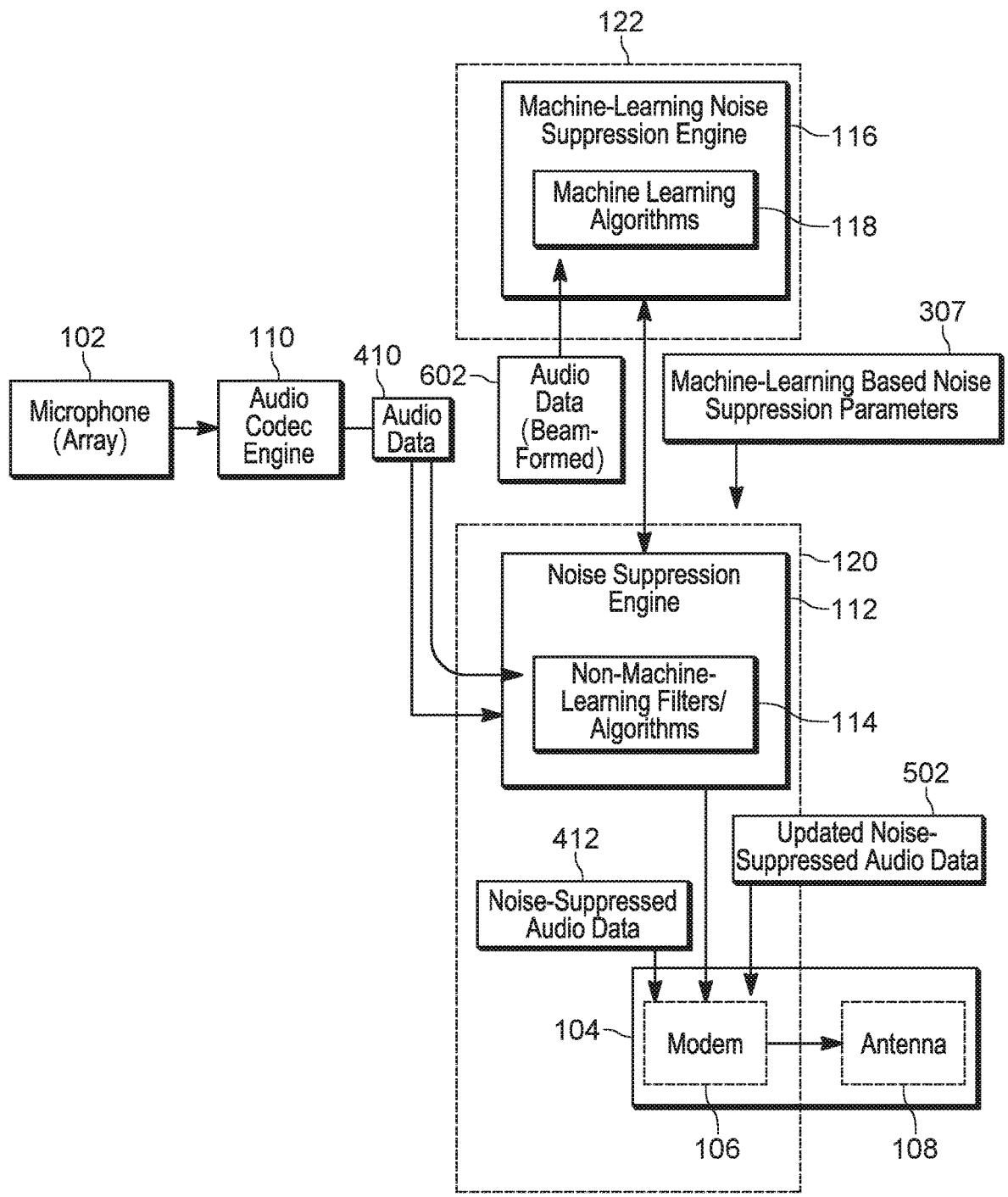
FIG. 6 is a device diagram showing an alternative device structure of the device for machine-learning based noise suppression, in accordance with some examples.

Attention is next directed to FIG. 6 which depicts an alternative structure of the device 100. In these examples, the noise suppression engine 112 receives the audio data 410 from the microphone 102 (e.g., via the audio codec engine 110), and may convert to beamformed audio data 602. However, in contrast to FIG. 4 and FIG. 5, the machine-learning noise suppression engine 116, and/or the audio processor 122, receives audio data from the noise suppression engine 112, for example in the form of the beamformed audio data 602. The noise suppression engine 112 generates the noise-suppressed audio data 412 (e.g., from the beamformed audio data 602), and provides the noise-suppressed audio data 412 to the output device 104 (e.g. to the modem 106 such that the noise-suppressed audio data 412 is transmitted via the antenna 108), while the machine-learning noise suppression engine 116 applies the one or more machine learning algorithms 118 to the beamformed audio data 602 to generate the machine-learning based noise suppression parameters 307. The machine-learning noise suppression engine 116 provides the machine-learning based noise suppression parameters 307 to the noise suppression engine 112, which applies the machine-learning based noise suppression parameters 307 to the noise-suppressed audio data 412 to generate the updated noise-suppressed audio data 502, which is provided to the output device 104 in place of the noise-suppressed audio data 412 (e.g. the updated noise-suppressed audio data 502 is provided to the modem 106 such that the updated noise-suppressed audio data 502 is transmitted via the antenna 108).

Figure 7:
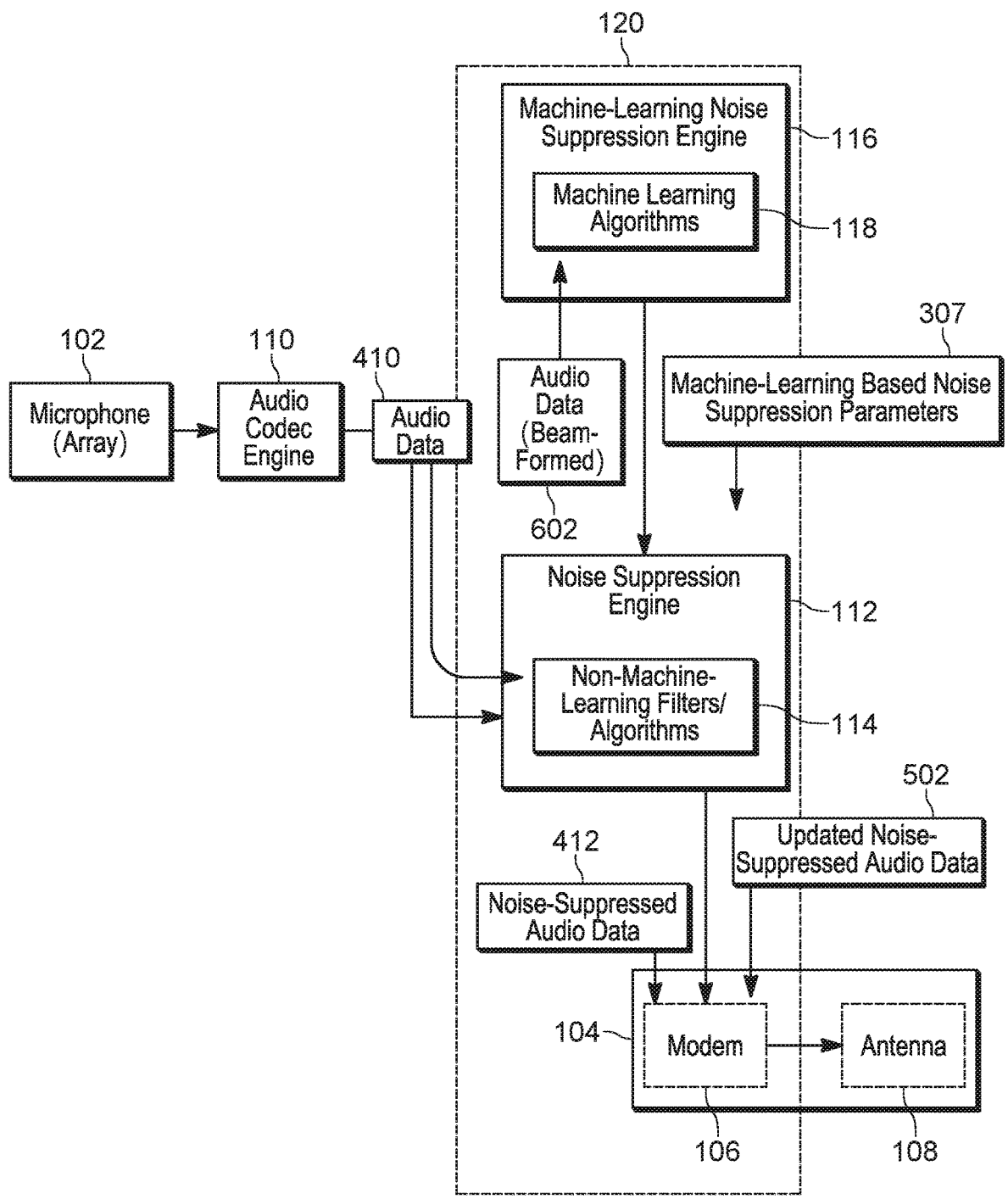
FIG. 7 is a device diagram showing a further alternative device structure of the device for machine-learning based noise suppression, in accordance with some examples.

Attention is next directed to FIG. 7 which depicts yet another alternative structure of the device 100. In these examples, both the noise suppression engine 112 and the machine-learning noise suppression engine 116 are implemented, in parallel, at the baseband processor 120. In such examples, it is understood that the baseband processor 120 has been adapted to include sufficient processing power to implement both the noise suppression engine 112 and the machine-learning noise suppression engine 116 in parallel without introducing delays into generation of the noise-suppressed audio data 412 and/or the updated noise-suppressed audio data 502.

Similar to the device structure of FIG. 6, the noise suppression engine 112 receives the audio data 410 from the microphone 102 (e.g., via the audio codec engine 110), and the machine-learning noise suppression engine 116, receives audio data from the noise suppression engine 112, for example in the form of beamformed audio data 602. The noise suppression engine 112 generates the noise-suppressed audio data 412, for example from the beamformed audio data 602, and provides the noise-suppressed audio data 412 to the output device 104 (e.g. the noise-suppressed audio data 412 is provided to the modem 106 such that the noise-suppressed audio data 412 is transmitted via the antenna 108), while the machine-learning noise suppression engine 116 applies the one or more machine learning algorithms 118 to the beamformed audio data 602 to generate the machine-learning based noise suppression parameters 307. The machine-learning noise suppression engine 116 provides the machine-learning based noise suppression parameters 307 to the noise suppression engine 112, which applies the machine-learning based noise suppression parameters 307 to the noise-suppressed audio data 412 to generate the updated noise-suppressed audio data 502, which is provided to the output device 104 in place of the noise-suppressed audio data 412 (e.g. the updated noise-suppressed audio data 502 is provided to the modem 106 such that the updated noise-suppressed audio data 502 is transmitted via the antenna 108).

It is understood that both engines 112, 116 use audio data in a same format. For example, when the noise suppression engine 112 generates the noise-suppressed audio data 412 from beamformed audio data, the machine-learning noise suppression engine 116 generates the machine-learning based noise suppression parameters 307 from beamformed audio data.

In some of these examples, at the baseband processor 120, the noise suppression engine 112 may have higher priority than the machine-learning noise suppression engine 116. Put another way, the baseband processor 120 may execute and/or implement the machine-learning noise suppression engine 116 once finished executing the noise suppression engine 112, and/or while the noise suppression engine 112 is not being executed and/or implemented. For example, the audio data 410 may be received in portions and/or sections (e.g. as an operator of the device 100 starts and then stops talking), and the baseband processor 120 may implement the noise suppression engine 112 to generate the noise-suppressed audio data 412 for a first portion and/or section of the audio data 410 to minimize delays in providing the noise-suppressed audio data 412 to the output device 104, and once the noise suppression engine 112 stops generating the noise-suppressed audio data 412, the baseband processor 120 may implement the machine-learning noise suppression engine 116 to generate the machine-learning based noise suppression parameters 307; however, generation of the machine-learning based noise suppression parameters 307 may be interrupted and/or execution and/or implementation of the machine-learning noise suppression engine 116 may be interrupted when further audio data 410 is received (e.g. prior to the completion of generation the machine-learning based noise suppression parameters 307) to again generate the noise-suppressed audio data 412 via the noise suppression engine 112. Implementation of the machine-learning noise suppression engine 116 to continue and/or complete generation of the machine-learning based noise suppression parameters 307 may occur once the noise suppression engine 112 again stops generating the noise-suppressed audio data 412. The noise suppression engine 112, once the machine-learning based noise suppression parameters 307 are received, may apply the machine-learning based noise suppression parameters 307 to generate the updated noise-suppressed audio data 502 using yet further received portions of the audio data 410. Hence, as both the engines 112, 116 are being implemented by the same baseband processor 120, such a priority scheme may ensure that the device 100 can still meet given audio delay specifications.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, beamform audio data, perform noise suppression on audio data, transmit audio data, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a microphone;
   an output device;
   a noise suppression engine configured to receive audio data from the microphone; and
   a machine-learning noise suppression engine configured to:
      receive the audio data from the noise suppression engine or the microphone;
      apply one or more machine learning algorithms to the audio data to generate machine-learning based noise suppression parameters; and
      provide the machine-learning based noise suppression parameters to the noise suppression engine,
   the noise suppression engine further configured to:
      prior to receiving the machine-learning based noise suppression parameters:
         apply non-machine-learning based noise suppression to the audio data to generate noise-suppressed audio data; and
         provide the noise-suppressed audio data to the output device; and
      after receiving the machine-learning based noise suppression parameters:
         apply the machine-learning based noise suppression parameters to the noise-suppressed audio data to generate updated noise-suppressed audio data; and
         provide the updated noise-suppressed audio data to the output device.

2. The device of claim 1, further comprising an audio codec engine,
   wherein the noise suppression engine is further configured to receive the audio data from the microphone via the audio codec engine, and
   wherein the machine-learning noise suppression engine is further configured to receive the audio data from: the noise suppression engine; or the microphone via the audio codec engine.

3. The device of claim 2, wherein the microphone comprises a microphone array, and wherein the machine-learning noise suppression engine is further configured to receive the audio data from:
   the noise suppression engine; or
   the microphone array via the audio codec engine.

4. The device of claim 1, wherein the microphone comprises a microphone array, and the noise suppression engine is further configured to:
   prior to applying the non-machine-learning based noise suppression to the audio data, perform beamforming on the audio data as received from the microphone array.

5. The device of claim 1, wherein the microphone comprises a microphone array, and the machine-learning noise suppression engine is further configured to:
   receive the audio data from the microphone by receiving the audio data from the microphone array; and
   prior to applying the one or more machine learning algorithms to the audio data, perform beamforming on the audio data to generate beamformed audio data; and
   apply the one or more machine learning algorithms to the beamformed audio data to generate the machine-learning based noise suppression parameters.

6. The device of claim 1, wherein the microphone comprises a microphone array, and the noise suppression engine is further configured to:
   prior to applying non-machine-learning based noise suppression to the audio data:
      perform beamforming on the audio data to generate beamformed audio data; and
      provide the beamformed audio data to the machine-learning noise suppression engine, and
   the machine-learning noise suppression engine is further configured to:
   receive the audio data from the noise suppression engine in a form of the beamformed audio data; and
   apply the one or more machine learning algorithms to the audio data, in the form of the beamformed audio data, to generate the machine-learning based noise suppression parameters.

7. The device of claim 1, further comprising:
   a baseband processor configured to implement the noise suppression engine; and an audio processor configured to implement the machine-learning noise suppression engine in parallel with the baseband processor implementing the noise suppression engine, the baseband processor and the audio processor in communication with each other.

8. The device of claim 1, further comprising:
a baseband processor configured to implement the noise suppression engine and the machine-learning noise suppression engine in parallel.

9. The device of claim 1, further comprising:
a baseband processor configured to implement at least the noise suppression engine,
wherein the output device comprises a modem and an antenna, and
wherein the modem of the output device is integrated into the baseband processor.

10. The device of claim 1, wherein the machine-learning based noise suppression parameters comprise one or more of:
a noise mask;
a binary noise mask;
a ratio noise mask;
a complex noise mask;
one or more noise directionality parameters;
one or more noise periodicity parameters; and
one or more noise spectral content parameters.

11. The device of claim 1, wherein the output device comprises a modem and an antenna.

12. The device of claim 1, wherein the non-machine-learning based noise suppression comprises one or more of a Wiener filter, a Personal Alert Safety System (PASS) alarm filter, a wind mitigation algorithm and a spectral subtraction algorithm.

13. A method comprising:
receiving, at a noise suppression engine, audio data from a microphone;
receiving, at a machine-learning noise suppression engine, the audio data from the noise suppression engine or the microphone;
applying, at the machine-learning noise suppression engine, one or more machine learning algorithms to the audio data to generate machine-learning based noise suppression parameters;
providing, from the machine-learning noise suppression engine to the noise suppression engine, the machine-learning based noise suppression parameters;
prior to the noise suppression engine receiving the machine-learning based noise suppression parameters:
applying, at the noise suppression engine, non-machine-learning based noise suppression to the audio data to generate noise-suppressed audio data; and
providing, from the noise suppression engine to an output device, the noise-suppressed audio data; and
after the noise suppression engine receiving the machine-learning based noise suppression parameters:
applying, at the noise suppression engine, the machine-learning based noise suppression parameters to the noise-suppressed audio data to generate updated noise-suppressed audio data; and
providing, from the noise suppression engine to the output device, the updated noise-suppressed audio data.

14. The method of claim 13, further comprising:
receiving, at the noise suppression engine, the audio data from the microphone via an audio codec engine, and
receiving, at the machine-learning noise suppression engine, the audio data from: the noise suppression engine; or the microphone via the audio codec engine.

15. The method of claim 13, wherein the microphone comprises a
microphone array, and the method further comprises:
prior to the noise suppression engine applying the non-machine-learning based noise suppression to the audio data, performing, at the noise suppression engine, beamforming on the audio data as received from the microphone array.

16. The device of claim 13, wherein the microphone comprises a microphone array, and the method further comprises:
receiving, at the machine-learning noise suppression engine, the audio data from the microphone by receiving the audio data from the microphone array; and
prior to the machine-learning noise suppression engine applying the one or more machine learning algorithms to the audio data, performing, at the machine-learning noise suppression engine, beamforming on the audio data to generate beamformed audio data; and
applying, at the machine-learning noise suppression engine, the one or more machine learning algorithms to the beamformed audio data to generate the machine-learning based noise suppression parameters.

17. The device of claim 13, wherein the microphone comprises a microphone array, and the method further comprises:
prior to the noise suppression engine applying the non-machine-learning based noise suppression to the audio data, performing, at the noise suppression engine, beamforming on the audio data to generate beamformed audio data;
providing, from the noise suppression engine to the machine-learning noise suppression engine, the beamformed audio data;
receiving, at the machine-learning noise suppression engine, the audio data from the noise suppression engine in a form of the beamformed audio data; and
applying, at the machine-learning noise suppression engine, the one or more machine learning algorithms to the audio data, in the form of the beamformed audio data, to generate the machine-learning based noise suppression parameters.

18. The method of claim 13, further comprising:
implementing the noise suppression engine at a baseband processor; and
implementing the machine-learning noise suppression engine at an audio processor in parallel with the baseband processor implementing the noise suppression engine.

19. The method of claim 13, further comprising:
implementing the noise suppression engine and the machine-learning noise suppression engine in parallel at a baseband processor.

20. The method of claim 13, further comprising:
implementing the noise suppression engine and the machine-learning noise suppression engine in parallel at a baseband processor, the noise suppression engine having higher priority than the machine-learning noise suppression engine at the baseband processor.

* * * * *